US009616559B2

(12) United States Patent
Slack

(10) Patent No.: US 9,616,559 B2
(45) Date of Patent: Apr. 11, 2017

(54) METHODS FOR INSTALLING SHOULDER RINGS IN THREADED PIPE COUPLINGS

(71) Applicant: Noetic Technologies Inc., Edmonton (CA)

(72) Inventor: Maurice William Slack, Edmonton (CA)

(73) Assignee: NOETIC TECHNOLOGIES INC., Edmonton (CA)

( * ) Notice: Subject to any disclaimer, the term of this patent is extended or adjusted under 35 U.S.C. 154(b) by 1013 days.

(21) Appl. No.: 13/868,106

(22) Filed: Apr. 23, 2013

(65) Prior Publication Data

US 2013/0228343 A1    Sep. 5, 2013

Related U.S. Application Data

(62) Division of application No. 12/525,366, filed as application No. PCT/CA2008/000395 on Feb. 28, 2008, now Pat. No. 8,439,406.

(Continued)

(51) Int. Cl.
| | | |
|---|---|---|
| *B25B 27/00* | (2006.01) | |
| *E21B 17/042* | (2006.01) | |
| *E21B 17/043* | (2006.01) | |
| *E21B 17/08* | (2006.01) | |
| *F16L 15/00* | (2006.01) | |
| *F16L 15/08* | (2006.01) | |
| *E21B 19/16* | (2006.01) | |

(52) U.S. Cl.
CPC ........ *B25B 27/0028* (2013.01); *E21B 17/042* (2013.01); *E21B 17/043* (2013.01); *E21B 17/08* (2013.01); *E21B 19/16* (2013.01); *F16L 15/003* (2013.01); *F16L 15/08* (2013.01)

(58) Field of Classification Search
CPC ................ B23P 19/04; B23P 3/00; B23P 1/00
See application file for complete search history.

(56) References Cited

U.S. PATENT DOCUMENTS 354,560 A    12/1886  Levier
595,437 A    12/1897  Greenfield
(Continued)

FOREIGN PATENT DOCUMENTS

CA    2450751      12/2002
GB    1235791 A1   6/1971

*Primary Examiner* — Lee D Wilson
(74) *Attorney, Agent, or Firm* — Donald V. Tomkins

(57) ABSTRACT

A shoulder ring, for installation in a threaded pipe coupling between the installed pin ends of two pipes being connected by the coupling, has opposing end faces and a central opening, and may be lobate or circular in shape. The shoulder ring provides enhanced axial retention within the coupling by incorporating a thread element which engages the internal threads of the coupling to prevent or deter displacement of the ring from the coupling. Alternatively, enhanced axial retention may be provided by way of an interference or interlocking fit that is plastically induced during the ring installation process. The shoulder ring may be of lobate or circular configuration, with the axial retention of lobate embodiments being further enhanced by forces acting radially outward against the coupling due to elastic deformation of the ring during installation. Also disclosed are tools for installing the shoulder rings in a threaded coupling.

2 Claims, 10 Drawing Sheets

Related U.S. Application Data

(60) Provisional application No. 60/892,320, filed on Mar. 1, 2007.

(56) References Cited

U.S. PATENT DOCUMENTS

| | | |
|---|---|---|
| 1,568,993 A | 1/1926 | Newsom |
| 1,941,061 A | 12/1933 | Thiry |
| 2,040,766 A | 5/1936 | Chappell |
| 3,287,032 A | 11/1966 | Kraybill |
| 3,339,945 A | 9/1967 | McCrory et al. |
| 3,574,357 A | 4/1971 | Alexandru et al. |
| 3,620,555 A | 11/1971 | Hinds et al. |
| 4,679,831 A | 7/1987 | Kielminski |
| 4,706,997 A | 11/1987 | Carstensen |
| 4,878,285 A | 11/1989 | Carstensen |
| 5,048,871 A | 9/1991 | Pfeiffer et al. |
| 5,129,689 A | 7/1992 | Newski et al. |
| 5,263,748 A | 11/1993 | Carstensen |
| 5,689,871 A | 11/1997 | Carstensen |
| 6,679,335 B2 | 1/2004 | Slack et al. |
| 6,811,187 B2 | 11/2004 | Otten et al. |
| 6,899,356 B2 | 5/2005 | Slack et al. |
| 7,010,840 B2 * | 3/2006 | Reale .................. B25B 27/062 29/255 |
| 7,108,063 B2 | 9/2006 | Carstensen |
| 7,510,219 B2 | 3/2009 | Huston |
| 2004/0036287 A1 | 2/2004 | Trivelli |
| 2005/0072002 A1 * | 4/2005 | Kubota ................ B21K 1/767 29/893.34 |
| 2010/0088879 A1 * | 4/2010 | Lohbeck .............. E21B 43/105 29/523 |
| 2010/0115758 A1 * | 5/2010 | Conley ................ F16L 13/143 29/516 |
| 2010/0237612 A1 | 9/2010 | Matherne et al. |
| 2013/0228343 A1 * | 9/2013 | Slack .................... E21B 17/042 166/380 |

* cited by examiner

METHODS FOR INSTALLING SHOULDER RINGS IN THREADED PIPE COUPLINGS

FIELD OF THE INVENTION

The present invention relates to couplings for joining tubular members, and in particular to shoulder rings for enhancing the torque capacity of such couplings. In addition, the invention relates to tools for installing shoulder rings in threaded couplings.

BACKGROUND OF THE INVENTION

Tubulars used to drill and complete bore holes in earth materials are typically joined by threaded connections. Numerous threaded connection geometries are employed to provide sealing and load-carrying capacities to meet drilling, installation and operating requirements. Of these geometries, tapered pipe threads are among the simplest and most widely used.

Within the context of petroleum drilling and well completion, wells are typically constructed by drilling the well bore using one tubular string, largely made up of drill pipe, then removing the drill pipe string and completing by installing a second tubular string, referred to as casing, which is subsequently permanently cemented in place. The tubular strings are formed by connecting lengths of pipe, referred to as joints, with threaded connections. With this traditional method of well construction, both the drill pipe and casing joint designs are separately optimized for the different performance requirements of the drilling and completion operations respectively. More specifically, the drill pipe connections must accommodate torque required to drill, which is not required during completion.

Recent advances in drilling technology have enabled wells to be drilled and completed with a single casing string, eliminating the need to 'trip' the drill pipe in and out of the hole to service the bit and make room for the casing upon completion of drilling. This change is motivated by potential cost savings arising from reductions in drilling time and the expense of providing and maintaining the drill string, plus various technical advantages, such as reduced risk of well caving before installation of the casing.

However, using casing to both drill and complete the well changes the performance requirements of the casing string, and more particularly the torque capacity of the casing connections, from those established through use within the traditional methods of well construction.

The most widely used of casing connections are the industry standard threaded and coupled buttress (BTC) and 8-round (LTC or STC) connections having tapered pipe thread geometries specified by the American Petroleum Institute (API). These connections have limited torque capacity and are thus not well suited to the casing drilling application, but are readily available and relatively inexpensive. To more fully realize the potential benefit of this emerging casing drilling system (CDS) technology, it is therefore desirable to find means to press these industry standard connections into service by identifying means to inexpensively increase their torque capacity.

Similar motivations to improve the sealing capacity of connections using API thread forms have led to the invention of apparatus and methods such as described in U.S. Pat. No. 4,706,997, U.S. Pat. No. 4,878,285, U.S. Pat. No. 5,283,748, U.S. Pat. No. 5,689,871, and U.S. Pat. No. 4,679,831. These patents generally describe inventions where a modified coupling, provided with an internal floating sleeve or seal ring, is employed to join pipes having standard API thread forms on their pin ends. The seal ring is positioned in the so-called J-section space between the pin ends of a made-up threaded and coupled connection. The seal ring internal diameter is approximately matched to the internal pipe diameter and is coaxially placed inside the coupling at its mid-plane so as to engage both pin ends when the connection is made up. According to the teachings of these inventions, this engagement or shouldering is primarily intended to enhance the seal performance of the connection beyond that provided by the standard API configuration. Several additional benefits are also obtained, such as improved flow performance and a smooth-running bore. The use of resilient materials in conjunction with the rigid seal ring or as separate seals is also taught as a means to further promote sealing.

While these descriptions of the prior art do not explicitly address the utility of such a "convertible metal ring" or seal ring as a means to improve the torque capacity otherwise available from API connections, the increased torque capacity is a well-known benefit. In fact, manufacturers of such connections quantify this parameter in published performance data such as provided by Hunting Oilfield Services for a product described as "the KC Convertible coupling system".

These prior art implementations of rigid seal rings recognise that the wide tolerance variation allowed for the pin and box geometries of threaded and coupled connections meeting API specifications permits a correspondingly wide range of axial position after make-up, if a satisfactory level of interference or "dimensional control" is to be achieved (see U.S. Pat. No. 5,283,748). Consequently, to obtain satisfactory "dimensional control", this prior art teaches that additional measures must be taken to reduce the tolerance range of pins and/or boxes provided for use with seal rings and to control the make-up position. Such steps include specifically manufacturing "modified boxes" to tighter tolerances than required by API specifications, and pre-screening of product manufactured to API tolerances to similarly obtain pins and boxes having more precisely controlled geometry. To ensure controlled placement and retention of the seal ring, it is taught that additional machining of the coupling's central thread region is required to form a seat for the seal ring. To obtain dimensional control of the so-called mill end make-up position, additional fixtures or measurements are required.

However, these prior art couplings require modification of the standard API components or increased quality control and, therefore, substantially reduce the benefits of low cost and simplicity originally sought from using existing industry standard couplings and pins. In addition, prior art couplings are in large part motivated by the desire to upgrade the pressure containment capacity of API connections and, as such, are not optimized to obtain the upgraded torque capacity desired for casing drilling applications.

U.S. Pat. No. 6,899,356 discloses a floating shoulder ring that may be used to substantially increase the ability of tubular connections to transmit torque. When placed internally between the pipe ends of a threaded and coupled pipe connection, the shoulder ring acts as a floating internal upset coupling shoulder capable of reacting compressive axial load between the pin ends and thus enhancing the connection torque capacity. The shoulder ring of U.S. Pat. No. 6,899,356 is particularly useful as a means to upgrade the torque capacity of tapered couplings such as, for example, unmodified API buttress and round threaded and coupled connections, manufactured to industry standard tolerances, to meet the requirements of casing drilling applications. The shoulder ring is placed substantially coaxially in the coupling of the connection, between the pin ends of the joined tubulars.

To be most generally useful for these applications, the floating shoulder ring should be amenable to rapid field installation on joints with couplings already bucked on (for example, in accordance with existing procedures as generally specified by API), without damaging the connection threads. It should be anchored or fixed securely enough to prevent being dislodged or knocked out from loads arising due to handling and installation operations such as make-up, break-out, or equipment movement in and out of the open-ended casing in the rig floor. In addition, the ring, once installed, should not substantially reduce the minimum diameter (drift diameter) through the connection, while being able to carry generally the maximum axial and torsional loads that can be carried by the pin tips to mobilize the full shouldering potential of the pin ends.

In general terms, the floating shoulder ring of U.S. Pat. No. 6,899,356 may be summarized as comprising a body having a central opening therethrough, a first end face on the body; an opposite end face on the body; an inner surface adjacent the central opening and extending between the first end face and the opposite end face and an outer surface extending between the first end face and the opposite end face; the body having a substantially uniform cross-sectional shape between the first end face; the opposite end face, the inner surface and the outer surface; and the ring being shaped such that its radius to the outer surface varies around the outer surface circumference to form a plurality of lobes.

The plurality of lobes define alternating radially-extending peaks and valleys around the inner surface and the outer surface circumferences. The radial peaks and valleys are contained within two circles having diameters referred to as the outer peak diameter and inner valley diameter. The outer peak diameter is preferably greater than the diameter of the coupling into which the ring is to be installed, so that when placed in a coupling, the peaks engage against the internal surface of the coupling with sufficient radial force to frictionally retain the ring in place and, coincidentally, to largely elastically deform the ring to displace the valleys radially outward and the peaks radially inward to force the ring into a generally circular configuration within the coupling. Preferably, the circumference of the outer surface is selected to be substantially the same as the inner circumference of the coupling into which the shoulder ring is intended to be installed.

The ring fits into the J-space between the pin ends in the coupling such that the inner surface of the ring is open to the coupled tubing string bore. In one embodiment, the inner surface circumference is less than the internal circumference of the pins and greater than the specified or otherwise required drift for the tubing string in which the ring is to be used.

The first and opposite end faces form torque shoulders against which the pin ends of pipe lengths may bear, upon application of sufficient torque across the connection when the pipe lengths are made up into the boxes of a coupling. When the pin ends of the pipe lengths in the coupling are torqued against the ring end faces, the forces cause a frictional response on the ring faces and in the threads, so as to react additional torque and prevent excess penetration of either of the pins into the coupling. In one embodiment, the end faces are substantially planar and/or smooth, to facilitate use as torque shoulders.

Preferably, the ring has a length between the first end face and the opposite end face sufficient to permit each of the pins to bear against the ring, when they are threaded into the coupling. Preferably, the length is selected to prevent excess penetration of the pins into their respective boxes of the coupling and to maintain the made-up pin position within the allowable power-tight position range such as that specified by API.

It is increasingly common for drill strings, casing strings, and production strings to be made up using a pipe-running tool mounted to a rotary top drive. Pipe-running tools, of which there are several known types, incorporate means for releasably engaging either the bore or outer surface of a pipe with sufficient strength to transfer the weight of a pipe section (or a pipe string) to the top drive, and to transfer torque from the top drive to a supported pipe section so as to connect it to, or disconnect it from, a pipe string. The specific mechanisms used to engage the pipe vary from one type of tool to the next, but they commonly incorporate some sort of slips or jaws that can be moved radially outward into gripping engagement with the bore of a pipe (i.e., internally gripping), or radially inward into gripping engagement with the outer surface of a pipe (i.e., externally gripping).

To make up a tubular string using an internally-gripping pipe-running tool, the pipe-running tool is "stabbed" into the box end of a new pipe section that is to be added to the string. The pipe-running tool is actuated to engage and grip the walls of the new pipe section as described above, and the top drive then lifts the new pipe section into position above the upper (box) end of the uppermost pipe section in the tubular string being added to. The top drive then lowers the new pipe section so that its bottom (pin) end enters the box end of the uppermost pipe section in the string. Finally, the top drive is rotated to screw the pin end of the new pipe section into the coupling, thereby completing the operation of adding the new pipe section to the string.

During break-out operations, this procedure is essentially reversed. The top drive lowers the pipe-running tool into engagement with the box end of the uppermost section of pipe in an existing pipe string. The pipe-running tool is then actuated to grippingly engage the upper pipe section. Then, with the lower portion of the string being restrained from rotation by other means, the top drive is rotated to unscrew the upper pipe section from the rest of the string. The removed pipe section is then disengaged from the pipe-running tool and moved to a storage location.

When the box end of a pipe section being added to or removed from a pipe string is fitted with a floating shoulder ring in accordance with U.S. Pat. No. 6,899,356, there can be a risk of the shoulder ring becoming dislodged when the pipe-running tool is disengaged. This risk arises, in the case of an internally-gripping tool, from the possibility of the shoulder ring becoming snagged by the tool's jaws, slips, or other pipe-engagement means, or, in the case of an externally-gripping pipe-running tool, from the possibility of the shoulder ring becoming snagged by the stinger that is typically used to sealingly engage the inside of the pipe with seal elements. Irrespective of the type of tools or equipment used to make up or break-out a pipe string, there is also the possibility that a shoulder ring could become dislodged from a box-end coupling when running any tools or equipment into or out of the pipe string, or if the shoulder ring adheres to the pin end of the pipe section above it. The latter condition could arise due to one or more factors, including metallic or adhesive bonding (perhaps induced by compression and/or torque during joint make-up), and build-up of foreign materials at the interface between the shoulder ring and the pin end of the pipe.

If a shoulder ring is dislodged or lost from a pipe coupling, due to one of the foregoing causes or any other cause, the ring will need to be repositioned or replaced—assuming, of course, that the loss or dislodgement of the shoulder ring is noticed before another pipe section is screwed into the coupling. If the dislodgement or loss of the shoulder ring is not noticed, there will be a corresponding reduction in the torque capacity of the coupling. For these reasons, there is a need for a shoulder ring of the same general type as disclosed in U.S. Pat. No. 6,899,356, but which provides enhanced resistance to dislodgement from a pipe coupling, over and above the resistance afforded by the radial forces exerted by the shoulder ring against the internal surface of the coupling due to elastic deformation of the ring during installation. The present invention is directed to this need.

BRIEF DESCRIPTION OF THE INVENTION

In a first aspect, the present invention is a shoulder ring for use in association with a threaded coupling between two tubular members, incorporating axial retention means for preventing or restricting dislodgement of the shoulder ring from the coupling. In a second aspect, the present invention is a shoulder ring installation tool, for installing the shoulder ring in a threaded coupling.

In a first embodiment of the shoulder ring of the present invention, the axial retention means is provided in the form of one or more thread-engaging elements disposed on the outer perimeter of the shoulder ring and adapted for threading engagement with the tapering internal threads of a standard pipe coupling. Whereas a prior art floating shoulder ring is pushed or pressed into the coupling and held therein by radial forces induced by elastic deformation, the shoulder ring of the first embodiment of the present invention is installed, whether by applied axial load or torque, into the coupling such that its thread-engaging element or elements will engage the internal threads of the field end of the coupling, such that the shoulder ring will resist displacement from the coupling in the event of an axial or prying forcing being inadvertently applied to the ring.

As with the floating shoulder ring of U.S. Pat. No. 6,899,356, the shoulder ring of the present invention may be lobate, in which case significant radial contact forces will develop between the ring and the coupling due to elastic stresses induced in the ring during installation. Persons of ordinary skill in the art will appreciate that means and methods can be readily devised for installing a lobate embodiment of the present invention into the box end of a tubular coupling can be readily devised, without restricting the scope of the invention. To provide a non-limiting example of a suitable installation method, a lobate shoulder ring may be pressed onto a mandrel so as to elastically deform it into a substantially circular shape prior to insertion into the coupling, whereupon the mandrel, with shoulder ring in place, may be inserted into the coupling without substantial radial contact occurring between the ring and the interior surfaces of the coupling during the installation process. Withdrawal of the mandrel will partially relieve the induced elastic forces in the ring, such that the ring's axial retention means will be urged radially outward into engagement with the threads of the coupling.

In an alternative installation method, means are provided for gripping a lobate shoulder ring of the present invention such that it can be rotated into the box end of the coupling, with the ring's axial retention means helically engaging the coupling's tapered internal threads, and with sufficient torque being applied to the shoulder ring to overcome friction forces that develop between the ring and the coupling as the ring progresses further into the tapering thread structure.

Regardless of the installation method used, the shoulder ring enjoys the benefits of elastically-induced radial forces that develop upon retraction of the installation tool, and these radial forces in fact enhance the security with which the thread-engaging elements are retained in the threads of the coupling.

The thread-engaging element or elements of the shoulder ring may take any of several forms. For example, the circumferential extent of the thread-engaging element can vary. The thread-engaging element could be a single 360-degree helical thread, or it could take the form of multiple intermittent projections lying on a helical path around the shoulder ring. The thread profile of the thread-engaging element may also take different forms, limited only by the practical requirement that it be of a design that will effectively engage the box thread of the coupling. The thread form is also not limited to a standard full-profile thread, and may have a customized profile modified to optimize elastic range and hoop stiffness, or to facilitate varying installation methods and tools.

In an alternative embodiment of the shoulder ring of the present invention, enhanced axial retention is provided in the form of a plastically-induced interference fit or an interlocking fit between the shoulder ring and the internal surface of the coupling. An interference fit, as the term is used in this patent specification (and as it is generally understood in the art), is a fit between two generally cylindrical and coaxially assembled inner and outer parts wherein the circumference of the inner part (i.e., the shoulder ring, in the present context) tends to be confined by the outer part (i.e., the coupling, in the present context), resulting in a residual compressive contact stress state acting between the assembled parts. An interlocking fit is to be understood as a geometric relation between the outer surface of the inner part (ring) and inner surface of the outer part (coupling) whereby axial movement tending to remove the ring tends to induce or increase interference between the parts (thus inhibiting separation of the parts).

In the present case, an interference or interlocking fit may be accomplished by using a shoulder ring configured to permit ready insertion into a coupling without deformation or rotation of the ring, and then applying sufficient forces applied radially outward to the shoulder ring to plastically deform the shoulder ring to effect an interference or interlocking fit with respect to the coupling, which interference or interlocking fit restricts axial movement of the shoulder ring inside the coupling. The radial forces for inducing plastic deformation may be applied uniformly or intermittently around the circumference of the ring. The induced plastic deformation may be either localized or global, and could be in the form of local deformation of external surface features such as ribs or roughening asperities provided on the ring.

In accordance with this particular embodiment of the invention, the shoulder ring may incorporate specific geometries and/or material property designs which facilitate general or localized plastic yielding of the shoulder ring in response to forces acting radially outward against the shoulder ring and correlative forces induced to act between the ring and coupling.

In a further aspect, the present invention is a tool for applying radially-outward forces against a shoulder ring sufficient to effect an interference or interlocking fit with internal surfaces of a pipe coupling.

In alternative embodiments, the shoulder ring of the present invention may be of non-lobate configuration (i.e., substantially circular), as will be explained in greater detail further on in this specification.

BRIEF DESCRIPTION OF THE DRAWINGS

Embodiments of the invention will now be described with reference to the accompanying figures, in which numerical references denote like parts, and in which.

DETAILED DESCRIPTION OF PREFERRED EMBODIMENTS

General Concepts

In accordance with the present invention, a shoulder ring is provided for placement in a threaded and coupled connection, such as a standard API connection, joining two lengths or joints of tubulars.

Shoulder Ring with Thread Element

Figure 1:
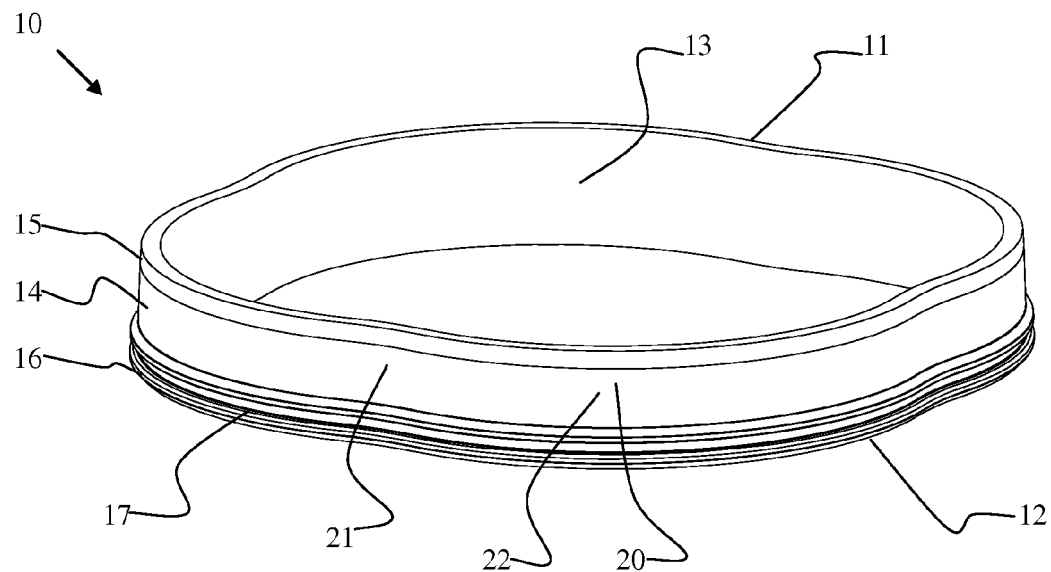
FIG. 1 is a perspective view of a lobate shoulder ring according to a first embodiment of the present invention.

According to a preferred embodiment of the present invention, as shown in FIG. 1, shoulder ring 10 has a mill end face 11 and a field end face 12, with an inner surface 13 extending between the mill end and field end faces. Outer face 14 of ring 10 has mill end 15 and thread element 17 at field end 16. Ring 10 as shown in FIG. 1 has a generally lobate shape; in the embodiment shown in FIG. 1, ring 10 has four lobes 20, with four lobe valleys 21 and four lobe peaks 22. Although it will be appreciated that the shoulder ring of the present invention may have two or more lobes (or zero lobes) if desired, the shoulder ring preferably is formed with a plurality of lobes designed to provide an effective hoop stiffness as required by the application and the diameter of the coupling in which the ring is to be used. A lobe is defined by radially extending peaks with valleys disposed therebetween, such that the radius varies about the ring's circumference.

Figure 2:
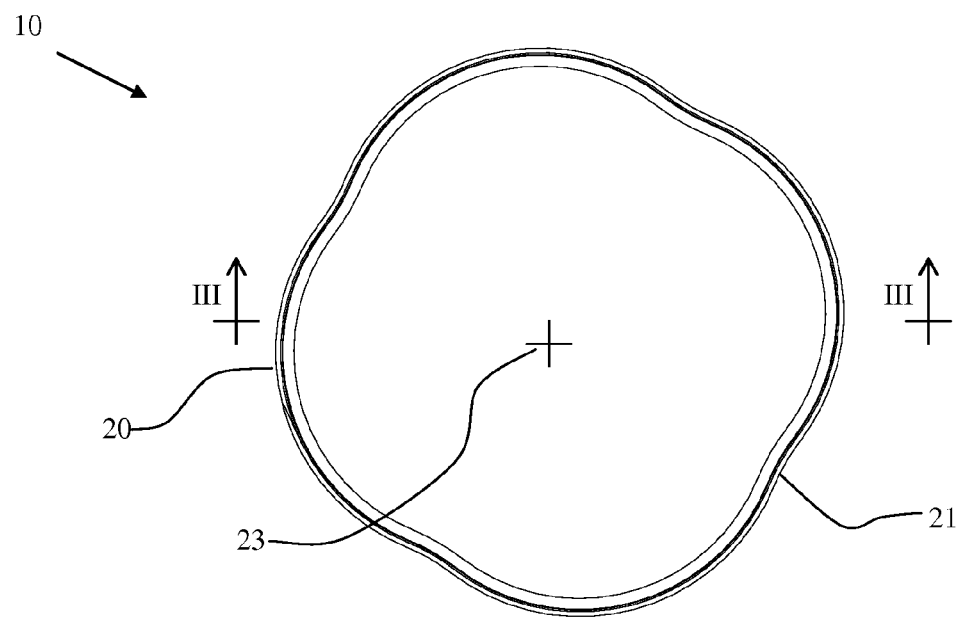
FIG. 2 is a top plan view of the shoulder ring of FIG. 1.

Referring now to FIG. 2, lobes 20 of ring 10 are generally shown to be of uniform configuration and evenly spaced about the ring circumference. It is to be understood, however, that the lobes can be spaced as desired, and that in the preferred embodiment lobe spacing is varied to achieve hoop stiffness required by the application and to accommodate variations in the manufacturing process.

Figure 3:
FIG. 3 is a sectional view along line III-III of FIG. 2.

Referring now to FIG. 3, ring 10 is shown to be of substantially uniform cross-section 18 around its circumference. As may be appreciated from FIG. 2, lobes 20 are formed by varying the radius of the ring's inner and outer surfaces, with the geometric centerpoint of the lobes typically being offset from the ring's centerpoint 23.

Referring again to FIG. 2, lobes 20 on shoulder ring 10 can be formed using numerous manufacturing methods. It has been found that lobate shoulder rings can be cold-formed, by applying radial loads sufficient to permanently deform rings that were originally circular. Fixturing may be used to ensure substantially uniform radial displacement at all valleys 21 relative to ring centerpoint 23.

Figure 4:
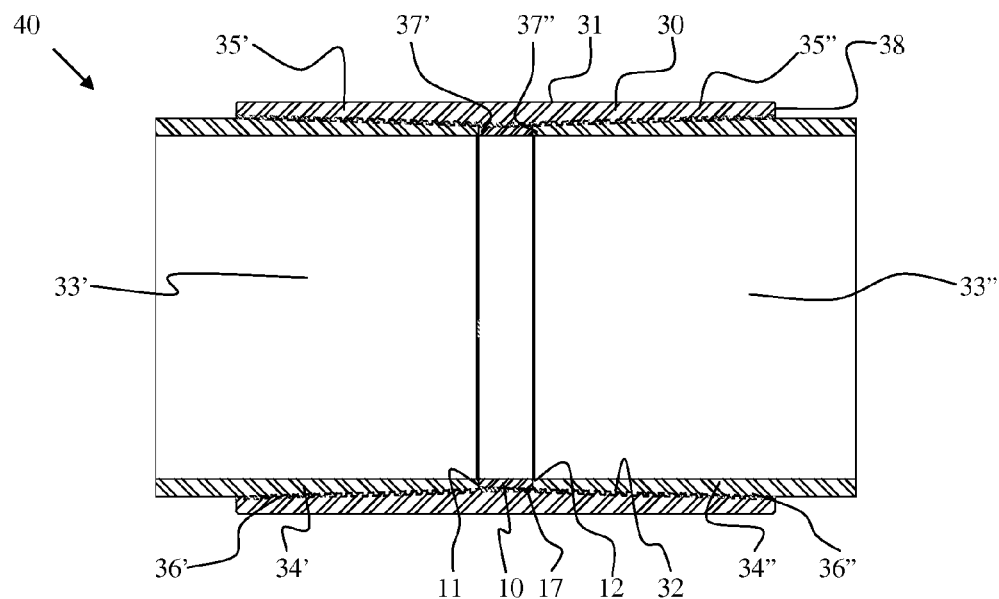
FIG. 4 is a partial sectional view through a tubular connection made up using a shoulder ring in accordance with the present invention.

FIG. 4 shows a partial section view of a tubular connection 40, with an internally taper-threaded coupling 30 having a shoulder ring 10 installed therein according to the present invention. Ring 10 is preferably to be installed so as to be longitudinally centered within coupling 30. Coupling 30 has outside surface 31 and inside threaded surface 32, which in this case is shown as a tapered API buttress thread. It is to be understood, however, that the thread form is not limited to API buttress; in preferred embodiments, ring geometry is customized for each specific thread form to provide the maximum incremental torque capacity.

Each of the two sets of female tapered threads of coupling 30 is commonly referred to as the box. In the process of making up a tubing string, the pin ends (i.e., male threaded ends) 34' and 34" of two joints of tubing 33' and 33" are threaded into boxes 35' and 35" respectively of coupling 30.

Referring still to FIG. 4, in accordance with typical industry practice, one of the coupling boxes is arbitrarily selected for first make-up. One pin end 34' of a tubular joint—which pin end is then referred to as the mill end pin—is threaded into the selected box 35' of the coupling 30. The box 35' joined to the mill end pin 34' is referred to as the mill end box, and the connection 36' is referred to as the mill end connection. As the name suggests, the mill end make-up is commonly completed at the pipe mill, and the tubulars thus prepared are shipped for eventual field assembly into a string for the well. The second make-up required for field assembly (the so-called field make-up) joins the open male threaded end 34" (termed the field end pin) to the open box 35" on a coupling (termed the field end box). This connection is termed the field end connection 36".

Referring still to FIG. 4, when ring 10 is placed in the center of a made-up coupling, end faces 11 and 12 act as shoulders or abutment surfaces, against which the end face 37' of the mill end pin 34' and end face 37" of the field end pin 34" can bear upon application of sufficient torque applied to complete the field end make-up, or subsequently during operations employing the string in the wellbore to further drill or complete the well or to perform other operations. The shoulder ring thus transmits load between the pin ends 34' and 34". The bearing load thus created on the pin ends, and reacted in the threads, results in an increased frictional capacity capable of resisting rotation and is largely responsible for increasing the torque capacity in the well-known manner of so-called shouldering connections. This interaction between torque and axial load is commonly employed in bolted connections where applied torque is used to pre-load the bolt and thus apply an axial clamping force. Simultaneously, if the bearing load is sufficient to cause pin end faces 37' and 37" to come into conformable contact with end faces 11 and 12 of the shoulder ring 10, shoulder seals are formed. In the preferred embodiment, end faces 11 and 12 are made smooth to enhance sealing capabilities between the ring and pin ends.

Referring still to FIG. 4, shoulder ring 10 may be installed in the coupling 30 anytime prior to stabbing the field end on the rig floor, including immediately prior to mill end make-up. However, ring 10 is preferably installed in the coupling after the mill end connection 36' is formed, and prior to assembly of the field end connection 36" on the rig floor. This is the least intrusive to existing operational practice, and allows the ring length (i.e., the longitudinal distance between end faces 11 and 12) to be selected to accommodate variations in mill end make-up position from the specified API power-tight position.

In certain applications, it is desirable to select the length of the ring to control the shoulder position for field end make-up. The shoulder position is determined by mill end make-up position and ring length. In tapered connections, radial interference imposed between pin and box is an increasing function of make-up position beyond hand-tight, which in turn establishes the interfacial contact stress in the threads required to effect a thread seal and, particularly in 8-round connections, to control joint strength. While sealing capacity and strength vary with contact stress, so do the likelihood and potential severity of galling and thread damage, which are detrimental to thread sealing, load capacity, and reusable life. Depending on the application, improved accuracy in control of make-up induced interference may therefore be used as a means to better optimize seal and load capacity against risk of thread damage and galling. Controlling field end shoulder position can thus be used to provide a more satisfactory interference state and may be accomplished as discussed hereinafter.

Referring still to FIG. 4, a variation in the power-tight position of the pin within the coupling is referred to as power-tight stand-off, and is the axial distance from the made-up position of the mill end pin 34' to the power-tight plane in the coupling as specified by API. The mill end power-tight stand-off may be determined in various ways, but is preferably obtained by measuring, such as by use of a caliper, the distance from the end face 37' of the mill end pin 34' to the face 38 of the coupling field end box 35" and subtracting one-half the coupling length and the specified distance between the center of the coupling and the nominal end of the power-tight plane. (See API Standard 5B, "Specifications for Threading, Gauging and Thread Inspection of Casing, Tubing and Line Pipe Threads".) The mill end power-tight stand-off thus determined may be used to select the length of ring prior to installation, so that the standoff can be compensated for, and the field end face 12 of the installed ring 10 can be near or at the power-tight plane of the field end box. The appropriate ring length should be selected for each connection. This adjustment is most easily accomplished by providing a selection of manufactured ring lengths from which to choose during installation. In casing drilling applications, satisfactory control of the field end position covering the entire allowable range of API tolerances is obtained by providing rings in three length increments.

Figure 5:
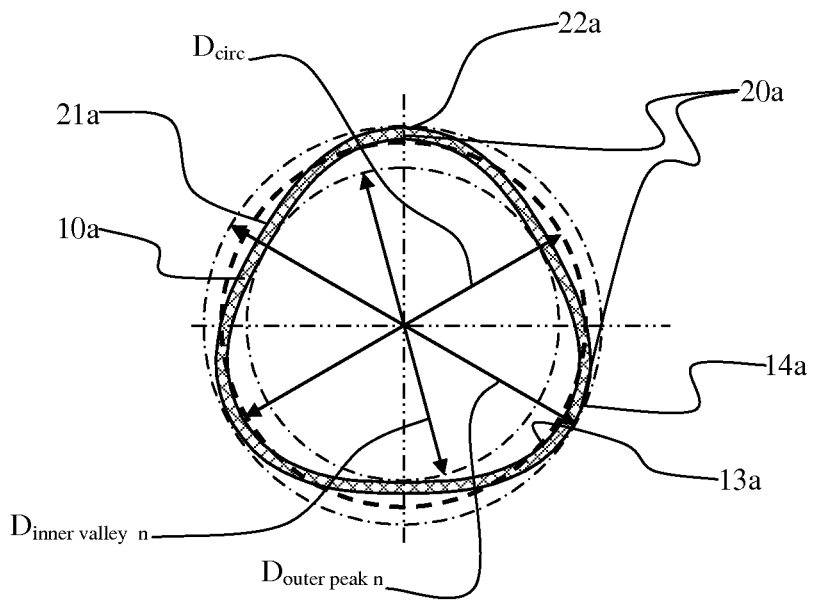
FIG. 5 is a top plan view of an alternative shoulder ring configuration, having three lobes (amplitudes shown exaggerated) and shown prior to installation.

Referring now to FIG. 5, which shows an end view of ring 10a with three lobes 20a, ring 10a is shown in the neutral configuration, prior to installation in a coupling and with no forces applied thereto. In the neutral configuration, the ring has an effective inner diameter, termed herein the inner valley diameter ($D_{inner\ valley\ n}$), which is the diameter of the circle contacting the innermost point of each of the valleys 21a of the ring inner surface 13a. The neutral ring also has an effective outer diameter, termed herein the outer peak diameter ($D_{outer\ peak\ n}$), which is the diameter of the circle circumscribing the outermost point of each of the peaks 22a of the ring outer surface 14a. The ring outer surface 14a also defines a circumference, the length of which equals a circle having the diameter $D_{circ}$. When selecting a ring for use in a particular coupling, the diameter $D_{circ}$ is selected to be substantially equal to or greater than the minimum diameter of the coupling, and the $D_{outer\ peak\ n}$ of the ring in the neutral configuration is selected to be greater than the minimum diameter of the coupling in which the ring is to be installed.

Figure 6:
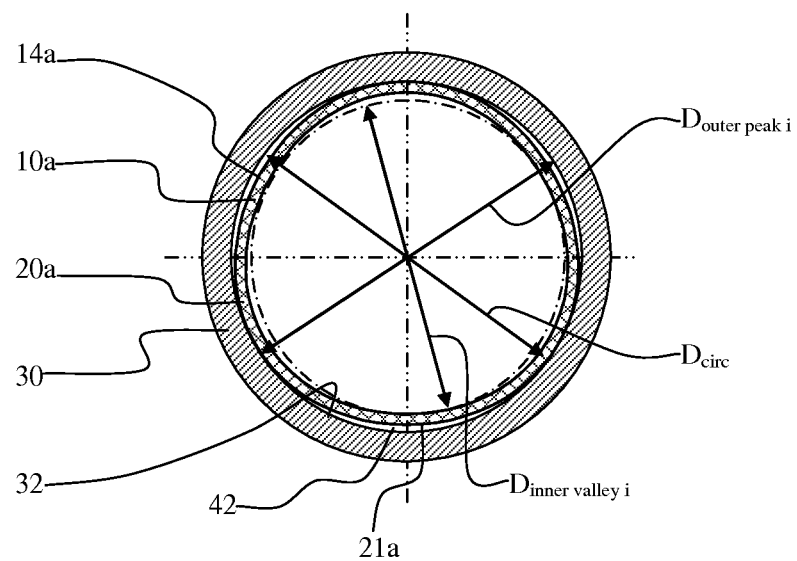
FIG. 6 is a transverse sectional view through a coupling, having installed therein a shoulder ring as in FIG. 5.

Referring to FIG. 6, installation of the preferred embodiment of the present invention is accomplished by threading the ring 10a into the open end of a coupling 30 towards the coupling center. As the ring 10a is forced into the coupling 30, the outer surface 14a comes into contact with and develops radial bearing forces against the inside surface 32 of the coupling box threads. The radial bearing forces are determined by the lobe geometry of the ring. The lobes are designed so as to maintain a balance between adequate retention force and ease of installation. As the ring 10a is advanced towards the center of the coupling, the outer peak diameter of the ring is reduced as confined by the decreasing diameter of the tapered box. This causes the radial height of the lobes 20a to be reduced such that the ring assumes a more circular configuration. When the ring is positioned at the coupling center the ring has an installed outer peak diameter ($D_{outer\ peak\ i}$) close to or the same as $D_{circ}$, as shown in FIG. 6. For illustration purposes, the initial amplitude of the lobes and the final gaps 42 between the outside surface of valley 21*a* and the coupling inside surface 32 are shown exaggerated in FIGS. 5 and 6.

By comparison between FIGS. 5 and 6, it will be evident that while the circumference of the ring 10*a* is substantially constant in the installed ring, the radial forces developed by installation of the ring cause the installed outer peak diameter ($D_{outer\ peak\ i}$) to be less than the neutral outer peak diameter ($D_{outer\ peak\ n}$), and the installed inner valley diameter ($D_{inner\ valley\ i}$) to be greater than the neutral inner valley diameter ($D_{inner\ valley\ n}$). Once installed, a gap 42 may or may not remain between the coupling and the ring outer surface at the valleys 21*a*, depending on the actual coupling diameter $D_{circ}$ and plastic flow allowed by virtue of the material from which the ring is manufactured.

It is to be understood that although the lobes in the illustrated embodiment are formed such that the valleys are urged radially outwardly when the ring is confined within the coupling, the ring can be formed such that the valleys are urged radially inwardly during installation. Whether the valleys are urged inwardly or outwardly will depend on the amplitude of the lobes and on the direction along which the stresses are conducted through the ring relative to the apexes of the valleys.

To meet the requirements for some applications such as casing drilling, the ring is preferably selected such that $D_{inner\ valley\ i}$ of the installed ring is less than the inner diameter of the pins and greater than the specified or otherwise required drift diameter for the tubing string in which the ring is to be used. It is preferred that the final inner diameter be less than the inner diameter of the tubing, so that the pin ends tend to not deform inwardly as readily when they bear against the ring at the upper limit of the system torque capacity. In addition, for applications where the pin end wall thickness and, therefore, the ring thickness are thin relative to the pipe body thickness, forming the ring thicker than the pin end wall thickness improves strength and stability, thus allowing higher loads to be carried by the same material.

The predominantly flexural stresses induced in the lobate shoulder ring during installation (due to the reduction of the outer peak diameter and the radial outward movement of the ring valleys) result in the ring of the present invention having a reduced effective hoop stiffness and an increased radial elastic range, compared to a constant-radius ring shape under "shrink fit" radial loading conditions. In this context, effective hoop stiffness is defined as the change in average radial stress developed on the exterior of a multi-lobe ring caused by a change in radius of a largely cylindrical confining surface (i.e., a surface having a diameter less than the initial outer peak diameter) divided by said change in radius (or, stated differently, the average contact stress increase between a multi-lobe ring and a confining surface, per unit decrease in the confining surface radius). Elastic range refers to the range of confining diameters over which the hoop stiffness of a multi-lobe ring is largely constant.

The effective hoop stiffness and elastic range can be adjusted by selecting the number of lobes, initial outer peak and inner valley diameters, and ring cross-sectional area. In particular, with respect to the hoop stiffness and the number of lobes on a ring, increasing the number of lobes on a ring with a given diameter requires each lobe to have a shorter wavelength and, therefore, requires the ring to have greater hoop stiffness. Generally speaking, the number of lobes on a ring will typically be selected for a given connection size and weight, to balance the gripping force with installation load over the tolerance range allowed by API in combination with other factors such as the installation method, risk of thread damage, and material selection.

While the ring is preferably formed from a material similar to that used to form the coupling, material mechanical properties can be used to adjust the effective hoop stiffness and elastic range of the ring. In addition or alternatively, the effective hoop stiffness and elastic range of the ring can be adjusted by forming the lobes of the ring to be non-symmetrical. Varying lobe shape may be used as another means to control effective hoop stiffness and elastic range to further optimize the gripping capacity of the ring. In particular, if the lobe shapes are not all similar, the lobe valleys will not tend to expand at the same rate when the peaks are forced to compress under confinement in the coupling. As an example, it might be useful to use a ring having alternating short and long wavelengths to provide higher gripping force over a greater elastic range of radial interference.

It is to be understood that although the thread element of the illustrated embodiment of the shoulder ring is formed continuously around the circumference of the ring, such that the effective hoop stiffness is substantially not dependent on the circumferential location of the lobe peaks and valleys, a ring can be formed such that the thread element is non-continuous around the circumference of the ring, and as such the lobes of the ring can be aligned so as to take advantage of the opportunity to optimize hoop stiffness and elastic range for the specific application. By configuring the ring so that the thread elements are located on the flanks of the lobes, rather than at the peaks and valleys, hoop stiffness is decreased because of the relatively large flexural stresses at the peaks and valleys during installation, as compared to the flanks.

It will be appreciated by persons skilled in the art that known stress analysis techniques such as the finite element method (FEM) may be advantageously used to optimize the selection of ring design parameters.

Figure 7:
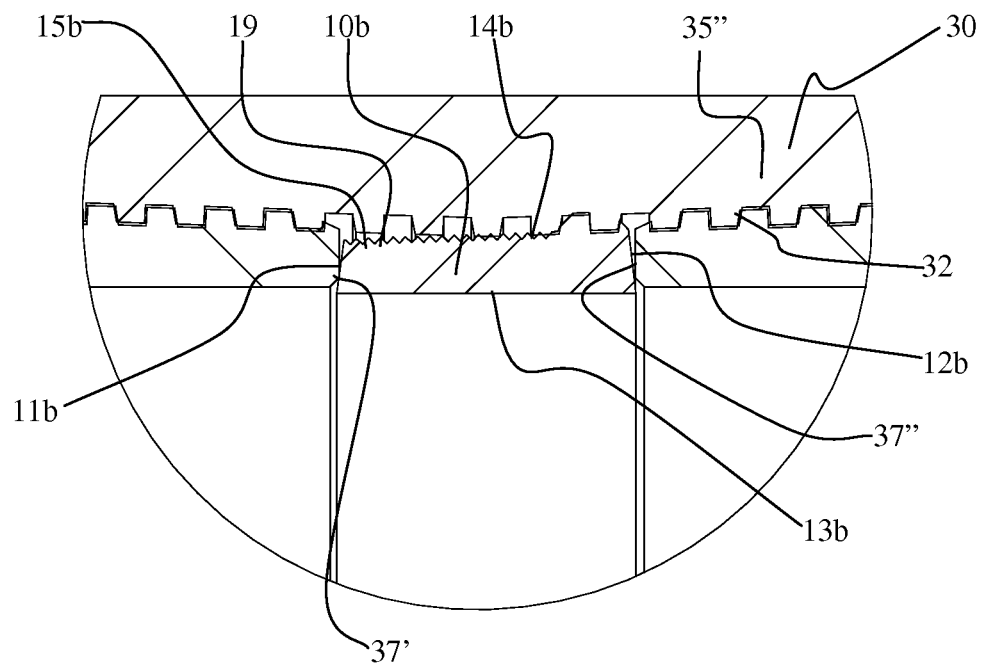
FIG. 7 is an enlarged sectional view through a tubular connection, parallel to the axis, and having installed therein a shoulder ring as in FIG. 3.

Referring to FIG. 7, in one embodiment the effective frictional capacity or gripping force provided by a ring 10*b* capable of exerting a given radial force is increased by roughening or texturing the ring's outer surface 14*b*. The roughening or texturing may be provided in various ways such as knurling or machining or directional teeth, and may be provided in combination with hardening. Simple V-shaped grooves 19, as shown, have provided substantially higher effective friction coefficients than obtained with smooth surfaces, and may be economically manufactured (such as cutting by circumferential machined grooves in the ring exterior surface 14*b*). Preferably, the outer surface of the ring is roughened prior to forming of the lobes.

Referring still to FIG. 7, as a further means to improve the gripping force of the ring of the present invention within a coupling, a portion of the outer surface 14*b* can be shaped generally frustoconically to flare outwards towards face 12*b* to follow the coupling box taper. In particular, to facilitate installation into a coupling preferably about one half of the length of the ring is made of generally uniform thickness. About half of the ring has an outer surface which flares outwardly toward face 12*b* such that the thickness of the ring is gradually increased from face 11*b* to face 12*b* of the ring 10*b*. This causes the ring to have a generally frustoconical shape covering all or a portion of the outer surface 14*b* and substantially matching the taper of the box coupling. Thus when the ring is properly installed in a tapered coupling, the field end 12*b* of the ring 10*b* is in contact with the field end threads of the coupling 30. The inner surface 13*b* preferably remains generally parallel to the axis of the connection along the entire length of the ring 10b. This embodiment accommodates installation of the ring into the coupling and past the coupling's minimum center diameter, but provides more conformable contact between the frustoconical portion on the outer surface 14b of ring 10b and the inside surface 32 of the coupling box (which will usually be the field end box 35").

Referring still to FIG. 7, a further increase in torque capacity can be gained, particularly from API connections of thinner wall tubulars, by shaping one or both of end faces 11b and 12b of ring 10b with a convex frustoconical profile. In particular, the ends can be formed to slope back from the inner edge to the outer edge providing a reverse-angle shoulder on which pin ends 37' and 37" bear when reacting torque. This will tend to prevent the pin end from sliding inward under application of high load. Instead, the pin end will be forced radially outwards causing it to pinch between the ring and the coupling, thus further increasing the torque capacity of the connection. To function properly with this configuration, the strength of ring 10b as a result of thickness or material properties must be sufficient to support the stresses at the thinner inner edge.

While a ring having both a roughened frustoconical outer surface and frustoconical end faces is shown in FIG. 7, it is to be understood that each of these modifications can be used independently in a particular ring, as desired.

The range of diameters allowed at the center of couplings manufactured to API specifications is large compared to the available elastic range of constant-radius steel rings, but is readily accommodated by rings of the present invention having a minimum of two but preferably three or more lobes, while simultaneously controlling the average radial stress to balance installation load against gripping force. This can be accomplished while preferably ensuring that the installed inner diameter does not fall below the minimum drift diameter required by the application for the rings installed in maximum internal diameter couplings, and preferably without substantially engaging the inelastic compressive hoop response of the ring when installed in a minimum diameter coupling.

Although in the embodiment shown in FIG. 4 the thread element 17 on ring 10 bears the same thread profile as the male threads on the outside surface of both pins 34' and 34", it is to be understood that the thread profile can be adjusted as desired to facilitate or enhance ease of installation or operational performance.

Figure 8:
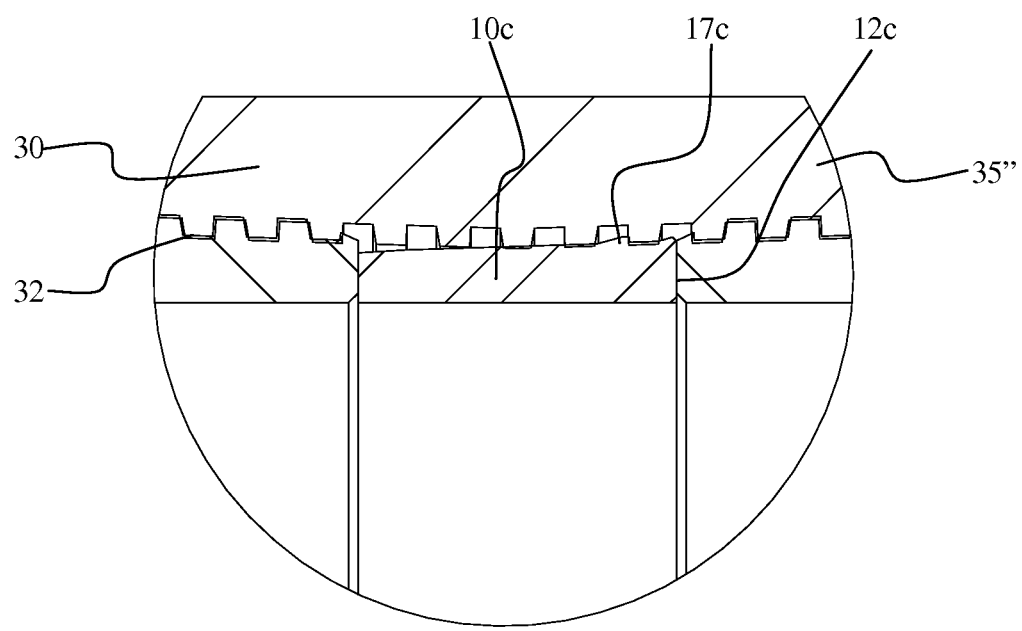
FIG. 8 is an enlarged sectional view through a tubular connection, parallel to the axis, and having installed therein a shoulder ring according to an embodiment of the present invention incorporating a low-profile, low stab flank angle thread form.

FIG. 8 illustrates an alternative embodiment of the shoulder ring of the present invention, adapted to eliminate any need for rotation or torque application during installation. In accordance with this embodiment, ring 10c has a thread element 17c with a low stab flank angle and a low thread height. Installation of this ring may be accomplished by forcing ring 10c into the coupling by application of axial force to the field end 12c of the ring 10c. By virtue of shoulder ring 10c having at least two (and preferably three or more) lobes, ring 10c will deform elastically, in the radial direction, as thread element 17c is pressed against the coupling's internal thread structure, such that thread element 17c will engage the coupling's thread structure.

Figure 9:
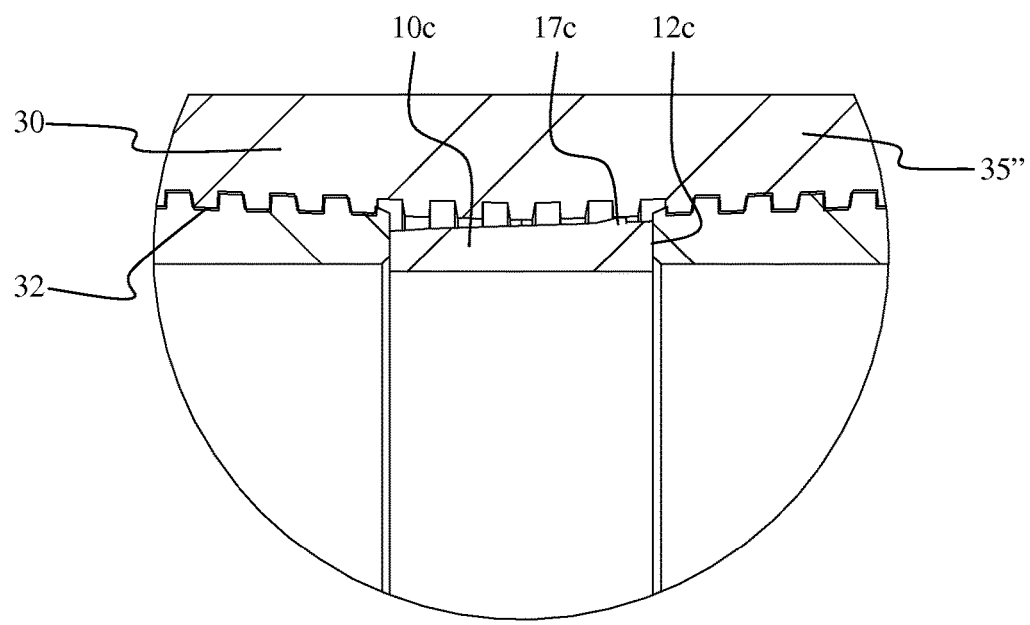
FIG. 9 is an enlarged sectional view through a tubular connection, parallel to the axis, and having installed therein a shoulder ring according to an embodiment of the present invention incorporating a low profile, low stab flank angle thread form.

Two possible post-installation configurations for a ring of this design are illustrated in FIGS. 8 and 9. In the first configuration, shown in FIG. 8, thread element 17c is engaged within the threads on the inside surface 32 of coupling 30. In the second configuration, shown in FIG. 9, thread element 17c is in contact with the crests of the female thread of the field end box 35" of coupling 30. In this configuration, ring 10c is axially retained within coupling 30 primarily by virtue of radial contact forces between thread element 17c and the thread crests and the resulting frictional resistance. However, should ring 10c become axially dislodged from the position shown in FIG. 9, thread element 17c will tend be urged into engagement (or further engagement) with the coupling's internal thread structure to provide additional axial retention force and thus prevent the ring from backing out further.

Figure 10:
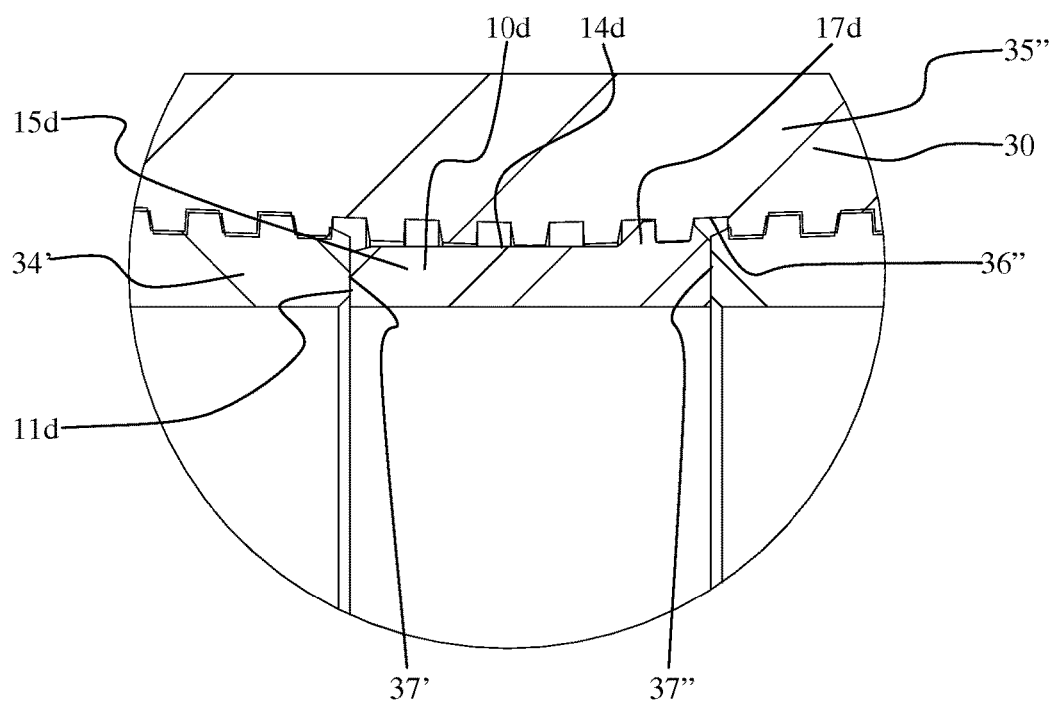
FIG. 10 is an enlarged sectional view through a tubular connection, parallel to the axis, and having installed therein a shoulder ring according to an embodiment of the present invention incorporating a zero lobe design.

In another embodiment of the invention, as shown in FIG. 10, ring 10d in its unstressed state has a circular shape with a constant radius and profile about the circumference (i.e., no lobes). Ring 10d has thread element 17d on outer surface 14d. The outside diameter of ring 10d is selected such that a coupling having the smallest diameter allowed by the specified tolerances for the coupling, thus minimizing required installation torque. Installation of ring 10d into a coupling 30 is accomplished by engaging thread element 17d with the threads of the field end coupling box 35" and rotating ring 10d until the mill end 11d of ring 10d contacts end 37' of mill end pin 34'; this will ensure substantially uniform and unrestricted axial load and torque transfer between pin ends 37' and 37" upon installation of the field end pin 37".

Various means can be used to position ring 10d in coupling 30, including installation by hand. Using this installation method, ring 10d may be threaded into coupling 30 as far as possible by hand, with subsequent rotation of the field end pin being effective to rotate ring 10d further into coupling 30.

Tools for Installing Shoulder Ring with Thread Element

Figure 11:
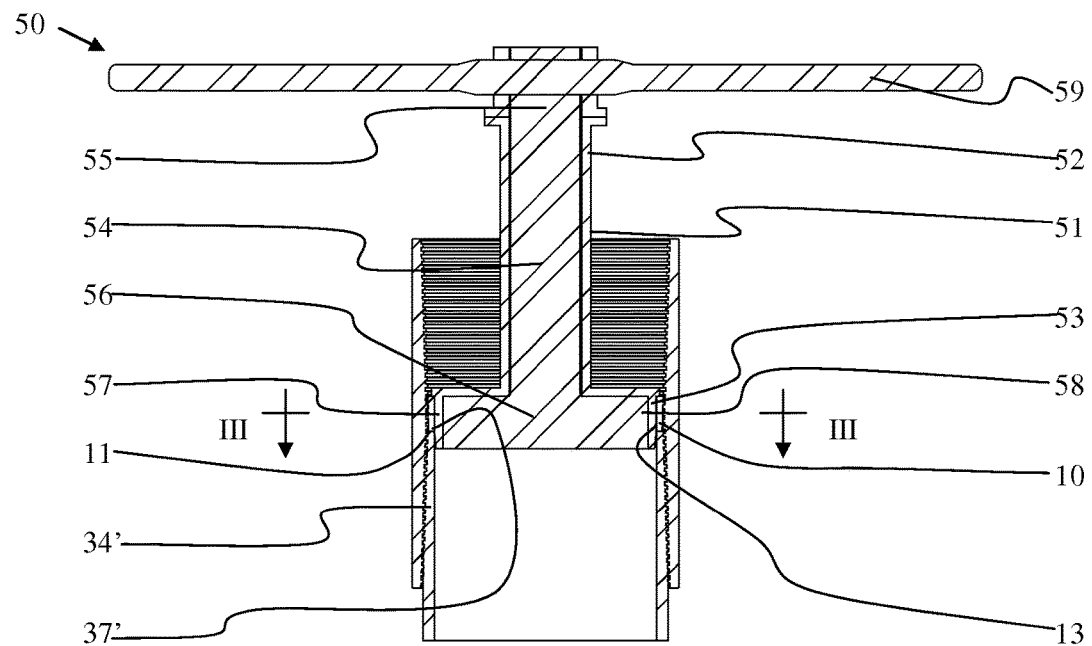
FIG. 11 is a partial sectional view, parallel to the axis, through a shoulder ring installation tool incorporating a torque-activated gripping mechanism.
Figure 12:
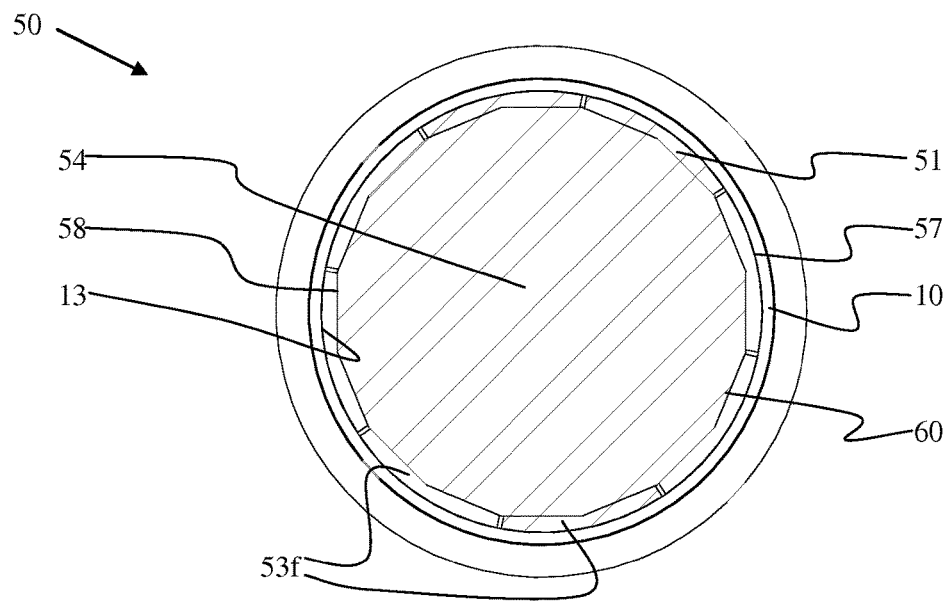
FIG. 12 is a partial sectional view, perpendicular to the axis of the connection, through the shoulder ring installation tool of FIG. 11.

A preferred embodiment of the shoulder ring installation tool of the present invention is shown in FIGS. 11 and 12. Referring now to FIG. 11, installation tool 50 comprises a gripping collet 51 with upper end 52 and lower end 53 carrying collet fingers 53f coaxially mounted outside and closely fitting with torque application shaft 54 with upper end 55 and lower end 56. Lower end 53 of collet 51 has a peripheral gripping surface 57 closely fitting and carrying ring 10. Torque application shaft 54 has a torque grip activation mechanism 58 at bottom end 56, and a torque application handle 59 at upper end 55. Torque is applied to torque application handle 59 at the top end 55 of torque application shaft 54.

Referring now to FIG. 12, torque grip application mechanism 58 is provided by arranging the close-fitting interface between the inside of collet fingers 53f and the outside surface of bottom end 56 of torque application shaft 54 as facetted interface 60 (illustrated in FIG. 12 as having 16 facets and 8 collet fingers 53f), so that upon application of torque to handle 59, gripping surface 57 of gripping collet 51 tends to be forced radially outwardly by the mechanics of faceted interface 60 of torque grip activation mechanism 58 to grip the inside surface 13 of ring 10. Referring again to FIG. 11, the ring 10 is rotated into position so that its mill end 11 contacts the end 37' of mill end pin 34'. Removing the applied torque will release the frictional contact between gripping surface 57 of gripping collet 51 and the inside surface 13 of ring 10. As may be required, reverse torque can be applied, also activating the grip mechanism for ring extraction.

Figure 13:
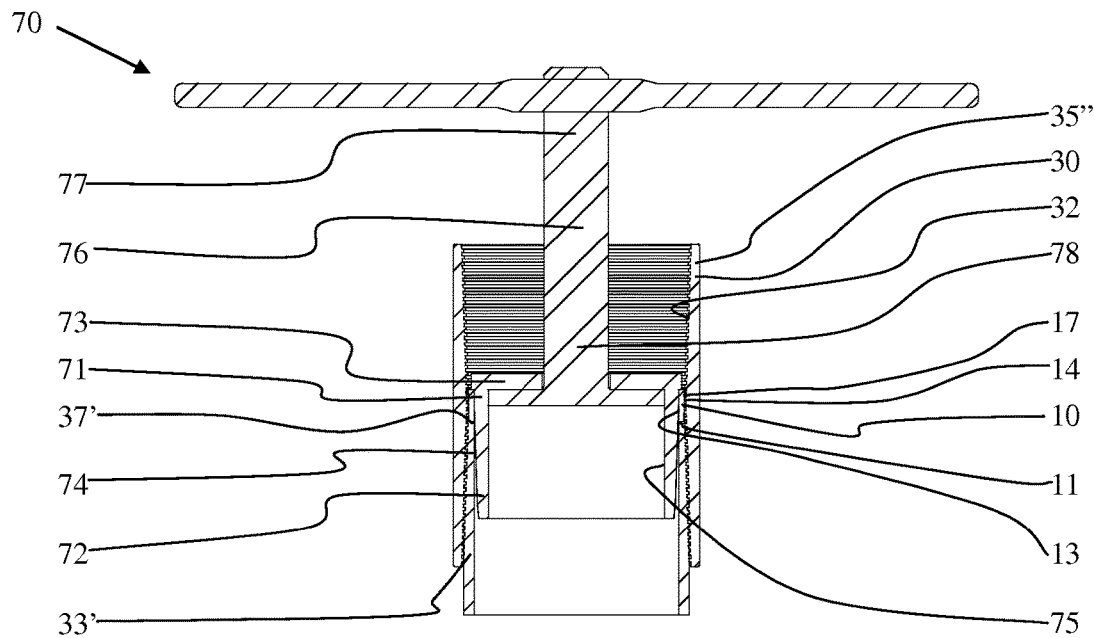
FIG. 13 is a partial sectional view, parallel to the axis of the connection, through a shoulder ring installation tool incorporating a frustoconical gripping surface.

In another embodiment, as shown in FIG. 13, installation tool 70 comprises a frustoconical grip 71 with lower end 72, upper end 73, outer surface 74, and inside surface 75, plus a torque application shaft 76 with upper end 77 and lower end 78. Installation tool 70 is operated by forcing ring 10 over the lower end 72 of the frustoconical grip 71 either by hand or using an axially-oriented hydraulic ram assembly (not illustrated). The inside surface 13 of ring 10 contacts the outside surface 74 on the lower end 72 of the frustoconical grip 71. The resulting radially outward force on the lobe valleys of ring 10 induces a radially outward movement of the valleys and a radially inward movement of the peaks so that ring 10 becomes substantially round. The ring 10 can then be threaded into the field end box 35" on the coupling 30 so that the mill end 11 of ring 10 contacts the end 37' of mill end pin 33'. Tool 70 is then pulled axially out of the box either manually or by using an axially-oriented hydraulic ram assembly (not illustrated), allowing the ring 10 to return, to the extent allowed by the inside surface 32 of the coupling 30, to a lobate shape.

Figure 14:
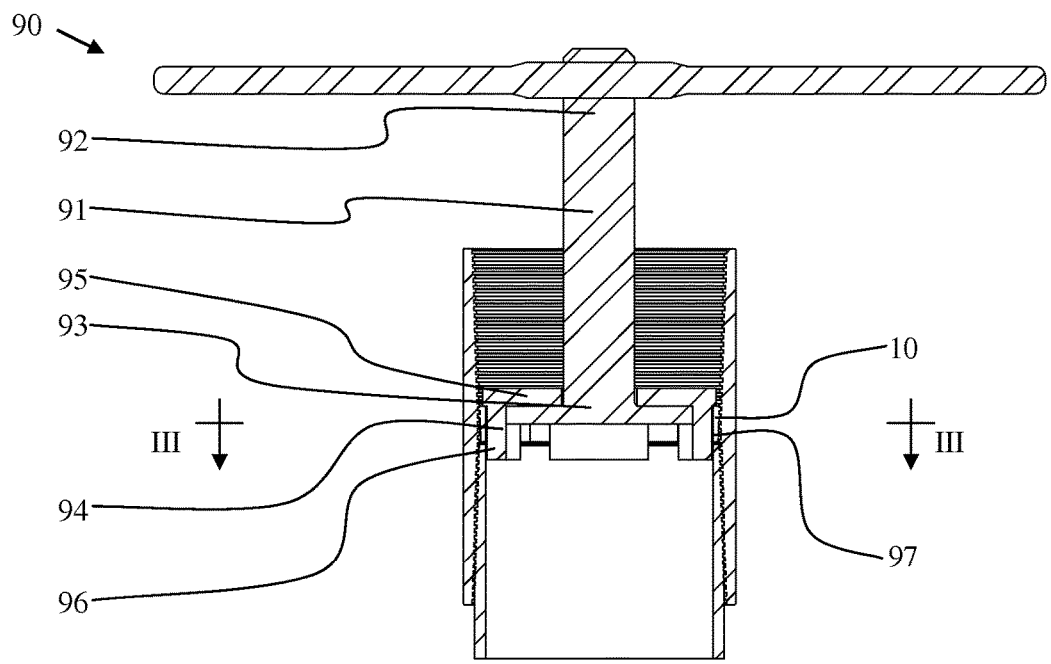
FIG. 14 is a partial sectional view, parallel to the axis of the connection, through a shoulder ring installation tool incorporating a lobed gripping mechanism.
Figure 15:
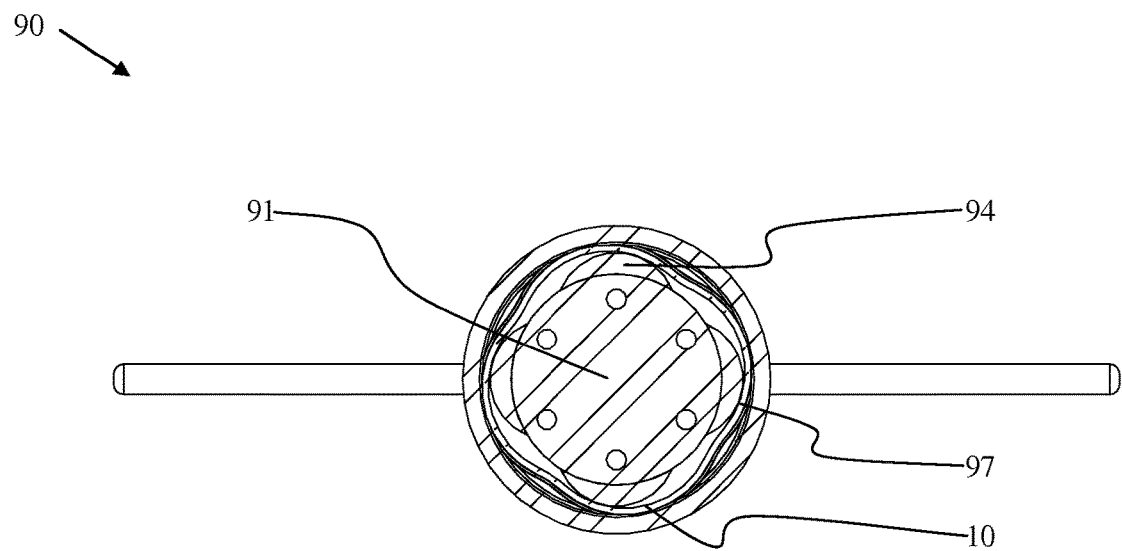
FIG. 15 is a partial sectional view, perpendicular to the axis of the connection, through the shoulder ring installation tool of FIG. 14.

In a further embodiment as shown in FIGS. 14 and 15, installation tool 90 comprises a torque application shaft 91 with upper end 92 and lower end 93, and a lobed grip 94 with upper end 95, lower end 96, and outer surface 97. Referring now to FIG. 15, the outside surface 97 of lobed grip 94 is designed to be in mating engagement with the inside surface of the lobes of ring 10. Referring again to FIG. 14, rotation and torque are then applied, manually or with mechanical assistance, to torque application shaft 91 to screw the ring into the center of the coupling. As ring 10 is advanced into the coupling 30 and the ring lobes engage the coupling, tangential drag is induced between the ring 10 and coupling 30 and reacted through the interaction of lobed grip 94, tending to rotate or advance the lobes of outside surface 97 relative to those of ring 10, which action feeds back to reduce the lobe amplitude of ring 10 and reduce the drag. As the ring approaches the center of the coupling, the lobe amplitude thus tends to become smaller, and slippage between the ring and the gripping surface becomes imminent if the ring becomes excessively round. Rings and lobe amplitude are therefore arranged to prevent this occurrence over the range of coupling diameter tolerance allowed by specifications for the coupling.

Outwardly Crimpable Shoulder Ring

Figure 16:
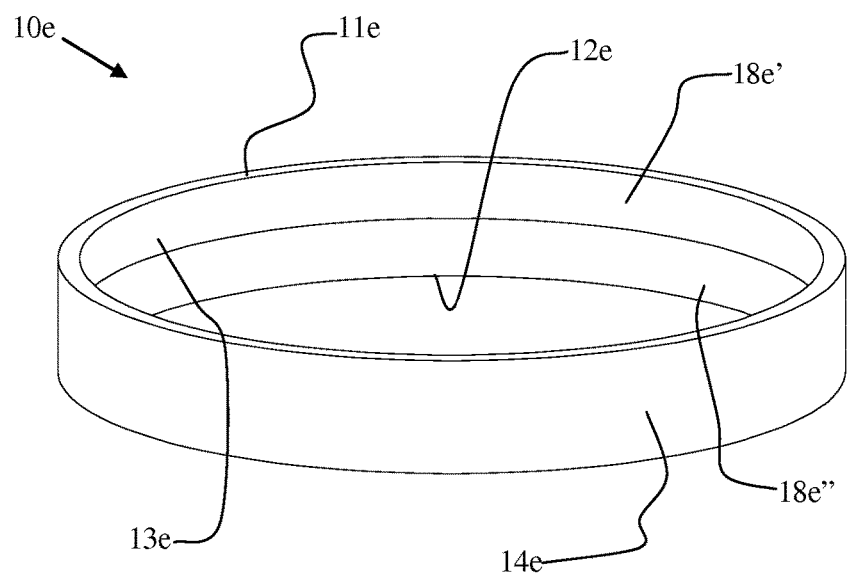
FIG. 16 is a perspective view of a shoulder ring according to an embodiment of the present invention incorporating a residual radial load-retention mechanism.
Figure 17:
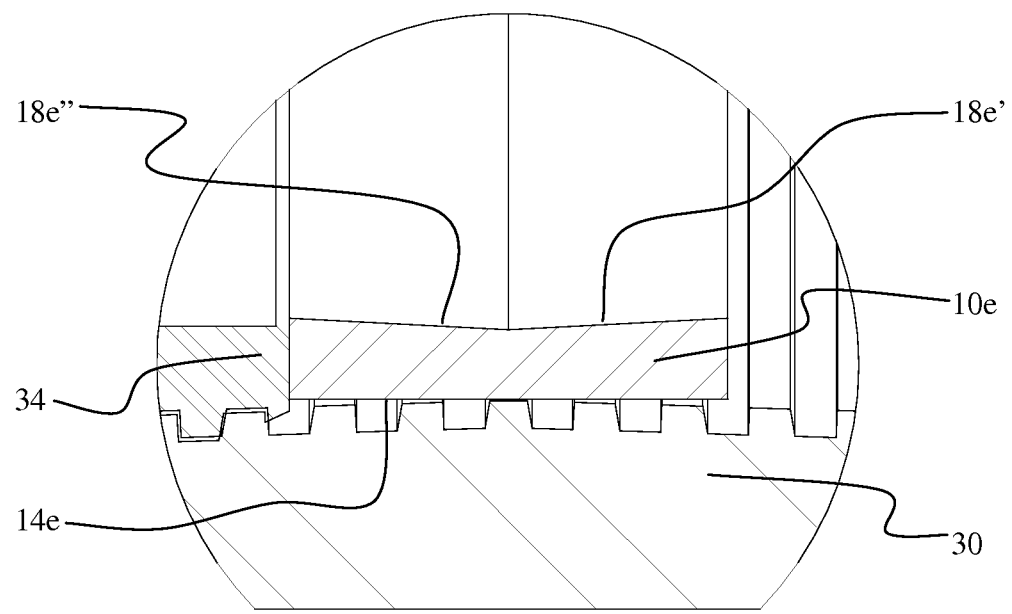
FIG. 17 is a sectional view of the shoulder ring of FIG. 16 placed in an internally taper-threaded coupling, shown prior to plastic deformation by application of outward radial force.

In an alternative embodiment, the shoulder ring of the present invention is adapted and configured such that it can be plastically deformed by application of radially outward forces applied to the ring after initial placement within a coupling, thereby providing axial retention within the coupling by way of an interference fit between the outer surfaces of the ring and the internal thread structure of the coupling. In accordance with this embodiment, and as illustrated in FIG. 16, ring 10e has a substantially cylindrical shape and is made from a suitably strong yet ductile metal, and has outer surface 14e, inner surface 13e, upper end face 11e, and lower end face 12e. Outer surface 14e of ring 10e is shown to be smooth; however, it will be understood that roughness (e.g., knurling, threading, or grooving) can be added to outer surface 14e to enhance gripping characteristics. As best seen in FIG. 17, the inner surface 13e of ring 10e is preferably profiled to define a pair of frustoconical surfaces 18e' and 18e", arranged such that the radial thickness of ring 10e is less at its longitudinal center point than at end faces 11e and 12e. Referring to FIG. 17, ring 10e is shown in cross-section centrally disposed within the bore of a taper-threaded coupling 30 threaded onto pin 34, as ring 10e would appear prior to plastic deformation.

Figure 18:
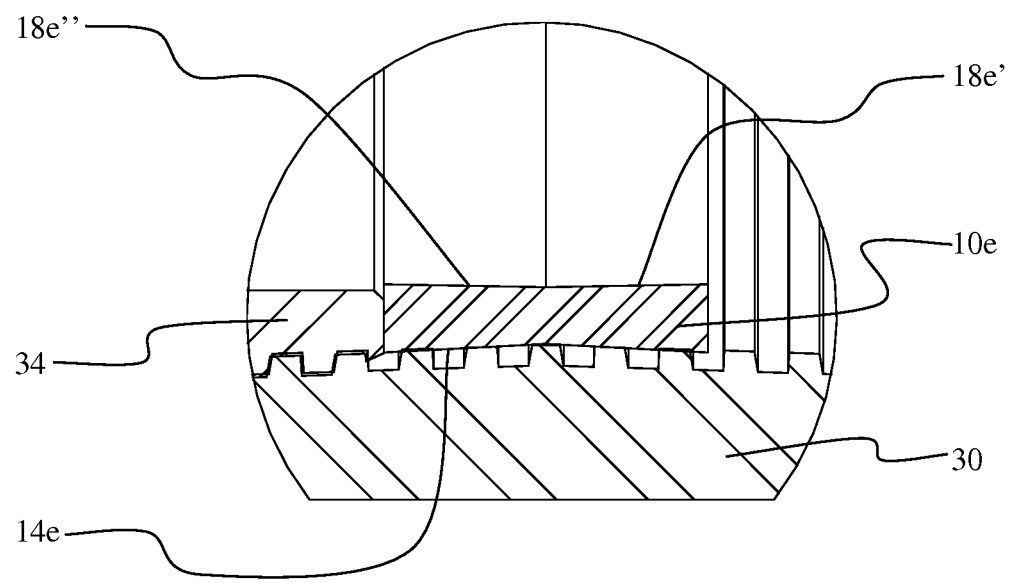
FIG. 18 is a sectional view of shoulder ring of FIG. 16 placed in an internally taper-threaded coupling, shown after plastic deformation by application of outward radial force.

Referring now to FIG. 18, shoulder ring 10e is again shown in coupling 30 but now as it would appear after deformation. Upon comparison of the shoulder ring's pre-deformation and post-deformation forms, as shown in FIG. 17, it will be apparent to one skilled in the art that the originally frustoconical internal surfaces 18e' and 18e" will tend to become cylindrical after deformation. Correlatively, the originally cylindrical outer surface 14e will tend to become shaped as a frustoconical pair of surfaces (or, perhaps, as a single, longitudinally concave surface), closely matching and interlocking with the shape of the tapered coupling threads. Such interlocking facilitates axial retention, while maintaining a relatively smooth bore so as not to encroach on the drift diameter of the casing string.

Axial retention can be further enhanced by controlling ring deformation so as to induce an interference fit either mechanically or thermally. Mechanical interference can be enhanced by selecting the elastic moduli and yield strengths of ring 10e and coupling 30 such that upon application of sufficient outward radial force to internal surface 13e, the elastic rebound or elastic strain induced in coupling 30 exceeds that induced in ring 10e, resulting in a residual interference fit upon release of the outward radial force. An interference fit can also be promoted or enhanced by way of a thermally-induced shrink fit, in accordance with methods well known in the art, by selectively controlling the relative temperatures of ring 10e and coupling 30 during ring deformation so that the thermal strain of the coupling 30 exceeds that of ring 10e.

It is to be understood that shoulder ring 10e is not restricted to the particular configuration shown in FIG. 16, and that one or more additional features (including but not limited to those features described herein with respect to other embodiments of the shoulder ring) can be added to enhance axial retention of ring 10e within the coupling, and/or to facilitate ring installation.

Tools for Installing Outwardly Crimpable Shoulder Ring

Figure 19:
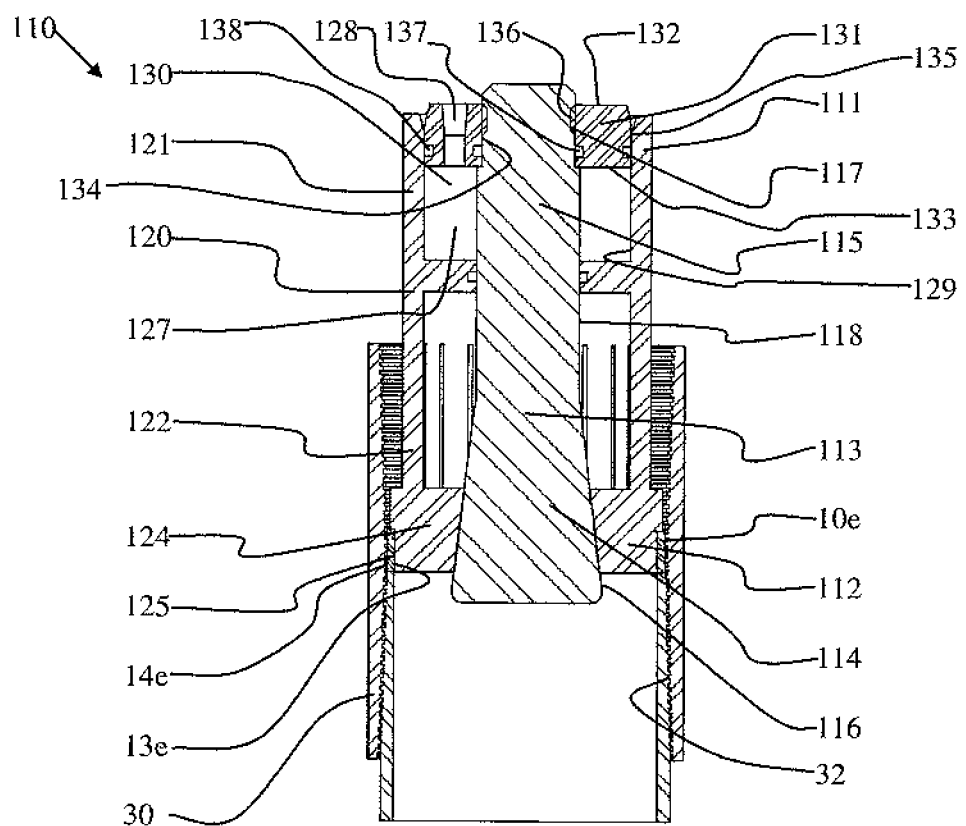
FIG. 19 is a partial sectional view, perpendicular to the axis of the connection, through a shoulder ring installation tool incorporating a mechanism for applying radially-outward forces against a shoulder ring.

FIG. 19 illustrates an installation tool for installing outwardly crimpable shoulder rings generally of the type described above with reference to FIGS. 16-18. As shown in FIG. 19, installation tool 110 has a top end 111 and a bottom end 112, plus a mandrel component 113 which extends axially along the length of the tool. The uppermost portion of mandrel 113 is substantially cylindrical, with a threaded connection 117 at upper end 115. This cylindrical portion of mandrel 113 transitions to a frustoconical section 116 which tapers or flares outwardly toward lower end 114.

Generally disposed around the outside surface 118 of mandrel 113 is a collet component 120. The collet 120 has an upper end 121 with axial load application mechanism 130, and a lower end 122 with a plurality of circumferentially arrayed collet die fingers 124 (sixteen in the illustrated exemplary embodiment) which are slidingly engageable with the alternately cylindrical or frustoconical outside surface 118 of mandrel 113. The collet die fingers 124 have grooves along their outer surfaces 125 which are adapted to grippingly engage the inside surface 13e of ring 10e. The load application mechanism 130—an axially-oriented hydraulic ram, in the illustrated embodiment—uses the mandrel 113, the collet 120, and a threaded seal ring 131 to form a fluid chamber 127. Threaded seal ring 131 has upper end 132, lower end 133, thread element 136, and seal groove 137 on inside surface 134, which threadingly and sealingly engages the outside surface 118 of mandrel 113, and a generally cylindrical outside surface 135 with integral seal groove 138, which slidingly and sealingly engages the inside surface 129 of collet 120. Pressure applied to fluid chamber 127 (via fluid port 128 in seal ring 131) induces an axial upward movement of the mandrel 113 relative to the collet 120, which in turn, induces a radial outward movement of the dies 124.

It is to be understood that while the axial load application mechanism 130 is shown and described herein as a hydraulic ram, it is not restricted to this design and as such could be provided in the form of other suitable and known mechanisms (such as a jack screw), without departing from the concept of the present invention.

As axial load is applied, the ring 10e is elastically and plastically deformed until the outer surface 14e is brought into contact with the inner surface 32 of coupling 30 so as to effect an interference fit. Additional radially outward force can be applied to the inside surface 13e of the ring 10e to further plastically deform the ring 10e and push coupling 30 further radially outward, thus effecting an interlocking fit by localized plastic deformation of ring 10e into the thread structure of coupling 30.

As previously indicated, the elastic moduli and yield strengths of ring 10e and coupling 30 can be selected such that upon application of sufficient outward radial force to internal surface 13e of ring 10e, the elastic rebound or elastic strain induced in coupling 30 exceeds that induced in ring 10e, resulting in a residual interference fit upon relaxation of the outward radial force. The residual radial interference is reacted as a contact force between the minimum diameter of the inside surface 32 of coupling 30 and the maximum diameter of the outside surface 14e of shoulder ring 10e, which contact frictionally resists the ring 13e from being displaced from the coupling 30.

It is to be understood that while the embodiment of the installation tool shown in FIG. 19 and described above applies radially outward force by means of a collet/mandrel assembly, the tool is not limited to that means of inducing ring deformation. To provide just one non-limiting example, the required radial installation load can be generated by alternative means such as radially-oriented, hydraulically-driven pistons. It will further be appreciated that the effective use of the interference-fit method of installing a shoulder ring, using installation tools as described or similar thereto, is not dependent on the use of shoulder rings of specific configuration. Although beneficial results may be achieved using shoulder rings with frustoconical inside surfaces as described above, the described installation method and installation tool are also adaptable for use with outwardly-crimpable shoulder rings of other configuration, including rings of substantially cylindrical form.

It will be readily appreciated by those skilled in the art that various modifications of the present invention may be devised without departing from the essential concept of the invention, and all such modifications are intended to come within the scope of the present invention.

In this patent document, the word "comprising" is used in its non-limiting sense to mean that items following that word are included, but items not specifically mentioned are not excluded. A reference to an element by the indefinite article "a" does not exclude the possibility that more than one of the element is present, unless the context clearly requires that there be one and only one such element.

What is claimed is:

1. A method for installing a substantially cylindrical shoulder ring in a threaded pipe coupling, said method comprising the steps of:
    (a) providing a shoulder ring installation tool having a mandrel adapted to receive a cylindrical shoulder ring, with said tool further having means for uniform application of radially outward force to said ring;
    (b) positioning a cylindrical shoulder ring on the mandrel;
    (c) inserting the mandrel into the cavity of a pipe coupling until the shoulder ring is approximately centered within the coupling; and
    (d) actuating the installation tool to exert radially-outward force to the ring sufficient to plastically deform the ring and effect an interference fit with an inner surface of the coupling, whereby the ring is axially retained within the coupling.

2. A method for installing a substantially cylindrical shoulder ring in a threaded pipe coupling, said method comprising the steps of:
    (a) providing a shoulder ring installation tool having a mandrel adapted to receive a cylindrical shoulder ring, with said tool further having means for uniform application of radially outward force to said ring;
    (b) positioning a cylindrical shoulder ring on the mandrel;
    (c) inserting the mandrel into the cavity of a pipe coupling until the shoulder ring is approximately centered within the coupling; and
    (d) actuating the installation tool to exert radially-outward force to the ring sufficient to plastically deform the ring and effect an interlocking fit with an inner surface of the coupling, whereby the ring is axially retained within the coupling.

* * * * *